United States Patent [19]
Cox et al.

[11] Patent Number: 5,517,746
[45] Date of Patent: May 21, 1996

[54] VARIABLE SPEED DIRECT DRIVE DRILL PRESS/ROUTER

[75] Inventors: Karmen D. Cox, St. Charles; George E. Hendrix, St. Louis, both of Mo.

[73] Assignee: Emerson Electric Co., St. Louis, Mo.

[21] Appl. No.: 302,201

[22] Filed: Sep. 8, 1994

[51] Int. Cl.⁶ .................................. B23P 23/02
[52] U.S. Cl. .................. 29/560; 29/26 A; 408/124; 409/231
[58] Field of Search ............... 29/26 A, 64, 560; 409/231, 64, 220; 408/124, 127, 8; 318/245, 798

[56] References Cited

U.S. PATENT DOCUMENTS

| | | | |
|---|---|---|---|
| 4,176,307 | 11/1979 | Parker | 318/798 |
| 4,317,176 | 2/1982 | Saar et al. | 318/245 X |
| 4,720,897 | 1/1988 | Orrell et al. | 29/26 A |
| 4,836,723 | 6/1989 | Flammini | 409/141 |
| 5,009,554 | 4/1991 | Kameyama et al. | 409/231 |
| 5,072,166 | 12/1991 | Ehsani | 318/696 |
| 5,113,104 | 5/1992 | Blaettner et al. | 310/90 |
| 5,187,401 | 2/1993 | Rahman | 310/156 |
| 5,237,231 | 8/1993 | Blaettner et al. | 310/239 |
| 5,246,349 | 9/1993 | Hartog | 417/371 |

*Primary Examiner*—William Briggs
*Attorney, Agent, or Firm*—Polster, Lieder, Woodruff & Lucchesi

[57] ABSTRACT

A variable speed direct drive drill press/router is disclosed. The drill press/router includes a housing supported above a horizontal bed which contains a generally vertically extending spindle that is rotatably mounted within and partially extends below the housing. A manually engageable or motor driven driver axially moves the spindle predetermined distances toward and away from the horizontal bed. For driving the spindle, a switched reluctance motor is mounted at the upper end of the housing for rotary driving engagement at a desired range of predetermined speeds throughout the entire range of axial movement of the spindle. The lower end of the spindle is capable of interchangeably receiving a workpiece rotating tool such as a drill or router for drilling or routing a workpiece.

25 Claims, 5 Drawing Sheets

VARIABLE SPEED DIRECT DRIVE DRILL PRESS/ROUTER

BACKGROUND OF THE INVENTION

The present invention relates to a variable speed direct drive drill press/router which utilizes the variable speed high torque characteristics of switched reluctance motors.

A drill press or overhead router generally has the same general configuration. Each includes an upright column supported by a heavy base. Suspended from the column is a table which may be moved up and down and clamped at the desired height. A drill head or housing is mounted on top of the column and supports a driving motor and spindle or spindles above the table. Speed adjustment is generally made by cone pulleys with V-belts that are mounted on the motor and the spindle. These machines provide a means to feed power to the spindle. Such a power feed includes a key way or spline in order to enable the spindle to be moved up or down along its axis, but still retain its drive at any point. A drill chuck at the lower end of the spindle holds a selected drill in position for drilling. By replacing the drill chuck with a collet, a routing tool can be mounted for routing purposes.

Induction motors have typically been used in prior art drill presses and routers. Unfortunately, it is difficult to vary the speed of induction motors and motor torque is also limited, particularly when the speed is reduced. The belts and step pulleys that are used to vary the spindle speed have a range of approximately 300–5000 rpm while the induction motor itself rotates at a constant speed. The belts and step pulleys also multiply the torque of the motor at low spindle speeds.

The variable speed direct drive drill press/router of the present invention employs a switched reluctance motor which eliminates the need for pulleys and belts, while making it very easy to control the speed of the motor and at the same time provide high torque at low speeds. Other features are also available as well apparent from the detailed discussion below.

SUMMARY OF THE INVENTION

Among the several object and advantages of the present invention include:

the provision of a new and improved variable speed direct drive drill press/router;

the provision of the aforementioned drill press/router which interchangeably receives a workpiece rotating tool such as a drill chuck or router collet at the lower end of a drive spindle;

the provision of the aforementioned drill press/router which includes a switched reluctance motor with an electronic drive that optionally includes speed control, brake control and high torque at low speeds;

the provision of the aforementioned drill press/router having a switched reluctance motor which instantly controls the speed of the motor while also having high torque at low speeds;

the provision of the aforementioned drill press/router which eliminates the needs for pulley and belts in varying spindle speed;

the provision of the aforementioned drill press/router where the direct drive is incorporated/closely associated with the drill press/router housing for driving engagement between the motor drive shaft and the driven spindle in the housing;

the provision of the aforementioned drill press/router wherein the direct drive motor and drill press/router housing are constructed to utilize at least some common parts;

the provision of the aforementioned drill press/router which includes a resilient coupling between the motor drive shaft and the driven spindle of the drill press/router housing;

the provision of the aforementioned drill press/router which includes a proximity or mechanical switch to sense the presence or absence of a router collet or drill chuck in order to allow high motor speeds only when a router collet is present;

the provision of the aforementioned drill press/router where the motor speed includes at least two speed ranges, one for drilling and one for routing and sometimes also a third speed range for shaper cutters;

the provision of the aforementioned drill press/router which provides a limited motor torque and/or a slow increase in motor speed during start-up that reduces the effect of workpiece grabbing or a possibly loose cutter bit during drilling or routing; and the provision of the aforementioned drill press/router which is durable; made of a minimum number of parts, utilizes existing components and technology in manufacture, assembly and operation; is simple and easy to operate; requires a minimum amount of maintenance; and is otherwise well adapted for the purposes intended.

Briefly stated, the variable speed direct drive drill press/router of the present invention includes a frame having a horizontal bed for supporting workpieces. A housing is supported by the frame above the horizontal bed, the housing having both an upper and a lower end. A generally vertically extending spindle is rotatably mounted within and partially extends below the lower end of the housing. For axially moving the spindle desired predetermined distances toward and away from a horizontal bed, a driver is connected to the spindle. The driver is preferably a manually engageable driver that extends from the housing but may also comprise a driver motor, if desired. A switched reluctance motor is mounted to the upper end of the housing and is connected to the spindle for rotary driving engagement with the spindle at a desired range of predetermined speeds throughout the entire range of axial movement of the spindle. The spindle at its lower end interchangeably receives a workpiece rotating tool such as a drill or router for drilling or routing a workpiece.

The switched reluctance motor includes a hollow driven shaft that is vertically and axially aligned with the spindle. The hollow driven shaft and the spindle are configured and sized for cooperative driving mating engagement during the entire range of axial movement of the spindle.

The hollow shaft has generally vertically extending internal splines along at least part of its interior wall which are complementary configured with external splines provided in the spindle for cooperative driving mating engagement throughout the entire range of axial movement of the spindle. Preferably, the hollow shaft includes an internally splined insert at its lower end which cooperates with the external splines on the spindle.

A resilient coupling may be provided between the internal splines of the hollow shaft and the external splines of the spindle to reduce vibration and noise. The resilient coupling may include resilient splines formed on at least one of the hollow shaft or spindle or a liner of resilient material between the internal splines of the hollow shaft and the external splines of the spindle.

The switched reluctance motor may be separate from and fastened to the housing either directly or by resilient bushings. The switched reluctance motor may also include an upper end bell, the lower end bell being an integral part of the upper end of the housing.

An electronic drive is provided for the switched reluctance motor. The electronic drive may be mounted in a cover which extends over the upper end bell of the switched reluctance motor. The electronic drive may include a shaft position encoder. In one embodiment, the hollow shaft of the switched reluctance motor extends upwardly within the cover and cooperates with the shaft position encoder. In other embodiments, the electronic drive and the shaft position encoder are located within the motor or the electronic drive is spaced from the motor while the shaft position encoder is located within the motor. The switched reluctance motor may include a brake for stopping the spindle to facilitate drill or router changes or a torque limiting means to restrain movement of the workpiece by a drill or router.

A sensing switch may be provided to determine the presence or absence of a drill chuck or router collet for selecting the speed of the spindle during drilling or routing. The sensing switch may be a proximity switch or a mechanical switch.

The variable reluctance motor is continuously variable from a drill press speed range operating at approximately 300 to 5000 rpm to a router speed range operating at approximately 15,000 to 25,000 rpm. If desired, the switched reluctance motor may include two speed ranges: a lower speed range for the drill press and a higher speed range for the router. Alternatively, a three speed range may be provided including a lower speed range for the drill press, an intermediate speed range for shaper cutters and a higher speed range for the router. Additionally, the motor speed may be increased slowly during starting to reduce the effect of workpiece movement or a loose cutter bit.

These and other objects and advantages will become apparent from the description that is to follow.

BRIEF DESCRIPTION OF THE DRAWING

Corresponding reference numerals will be used throughout the several figures of the drawings.

DESCRIPTION OF THE PREFERRED EMBODIMENTS

The following detailed description illustrates the invention by way of example and not by way of limitation. The description will clearly enable one skilled in the art to make and use the invention, and describes several embodiments, adaptations, variations, alternatives, and uses of the invention, including what we presently believe is the best mode of carrying out the invention.

The variable speed direct drive drill press/router of the present invention has the same overall construction for routing as for drilling except that a drill chuck which holds drills would be replaced by a collet typically used with routers and the switched reluctance motor would be operated at much higher speed. Typically, a drill press has a spindle speed that varies over a range of approximately 300–5000 rpm while the motor rotates at a constant speed. The switched reluctance motor incorporated in the present invention makes it very easy to control the speed of the spindle within the above speed range while also having high torque at low speeds. Additionally, the switched reluctance motors can be operated at much higher speed for the router such as a range of approximately 15,000–25,000 rpm. Thus, by using a switched reluctance motor, the same apparatus can be used for both a drill press/router by simply changing the drill chuck to a router or vice versa and by controlling the speed through a switched reluctance motor, as will be further discussed in detail below.

Figure 1:
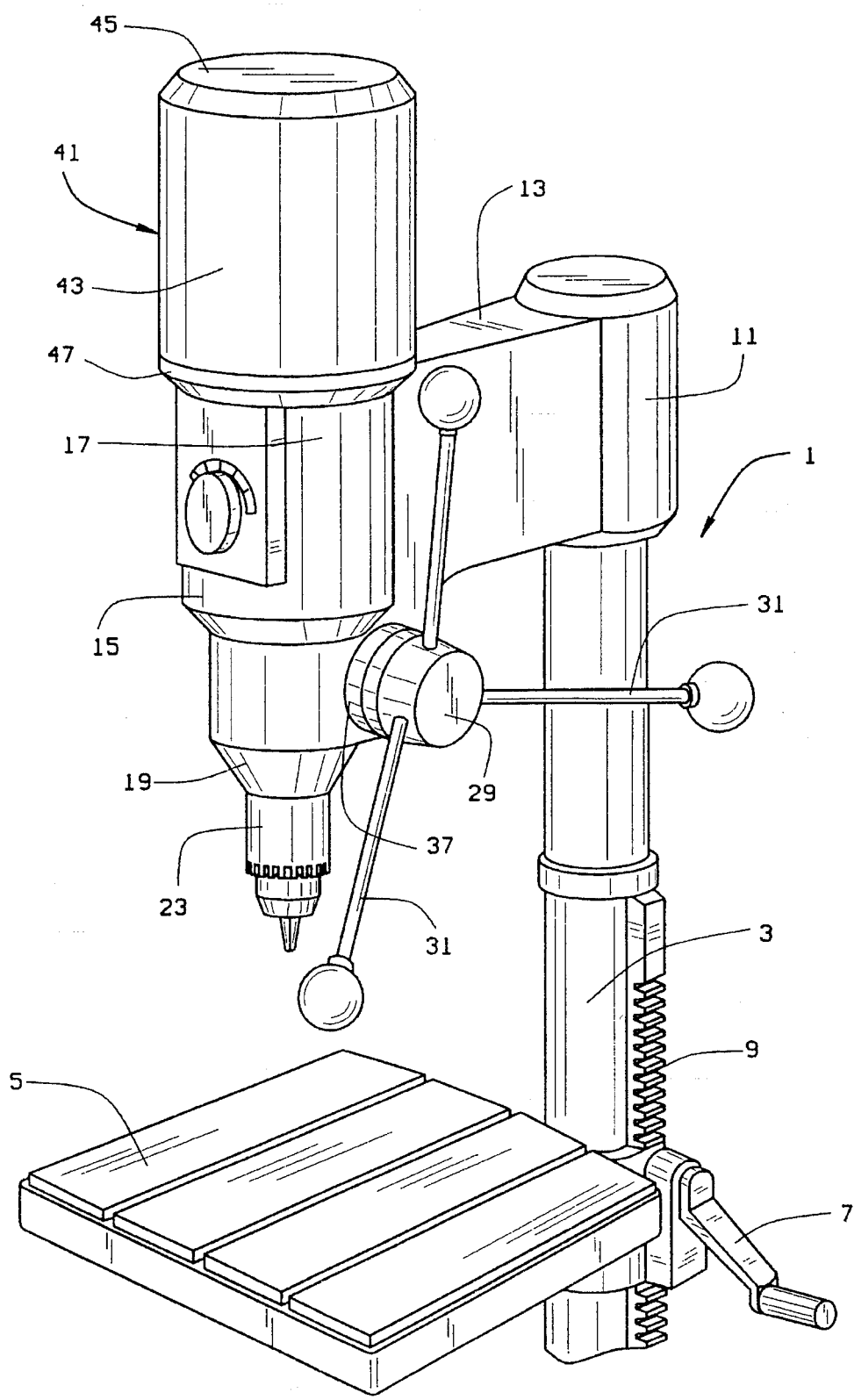
FIG. 1 is a fragmentary perspective view of a variable speed direct drive drill press/router incorporating the features of the present invention.
Figure 2:
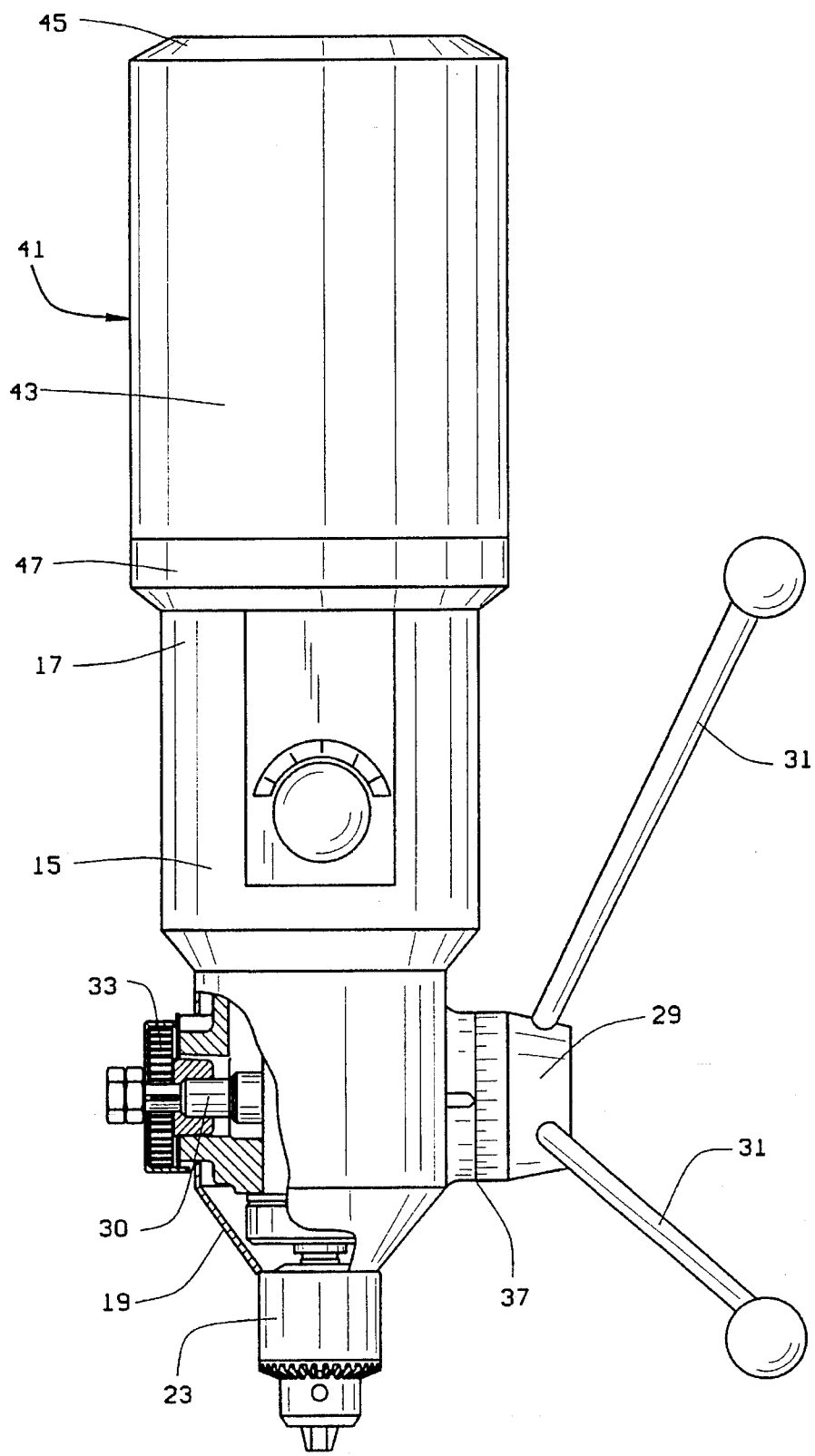
FIG. 2 is a fragmentary front elevational view, partly in section, of the variable speed direct drive drill press/router of the present invention.
Figure 3:
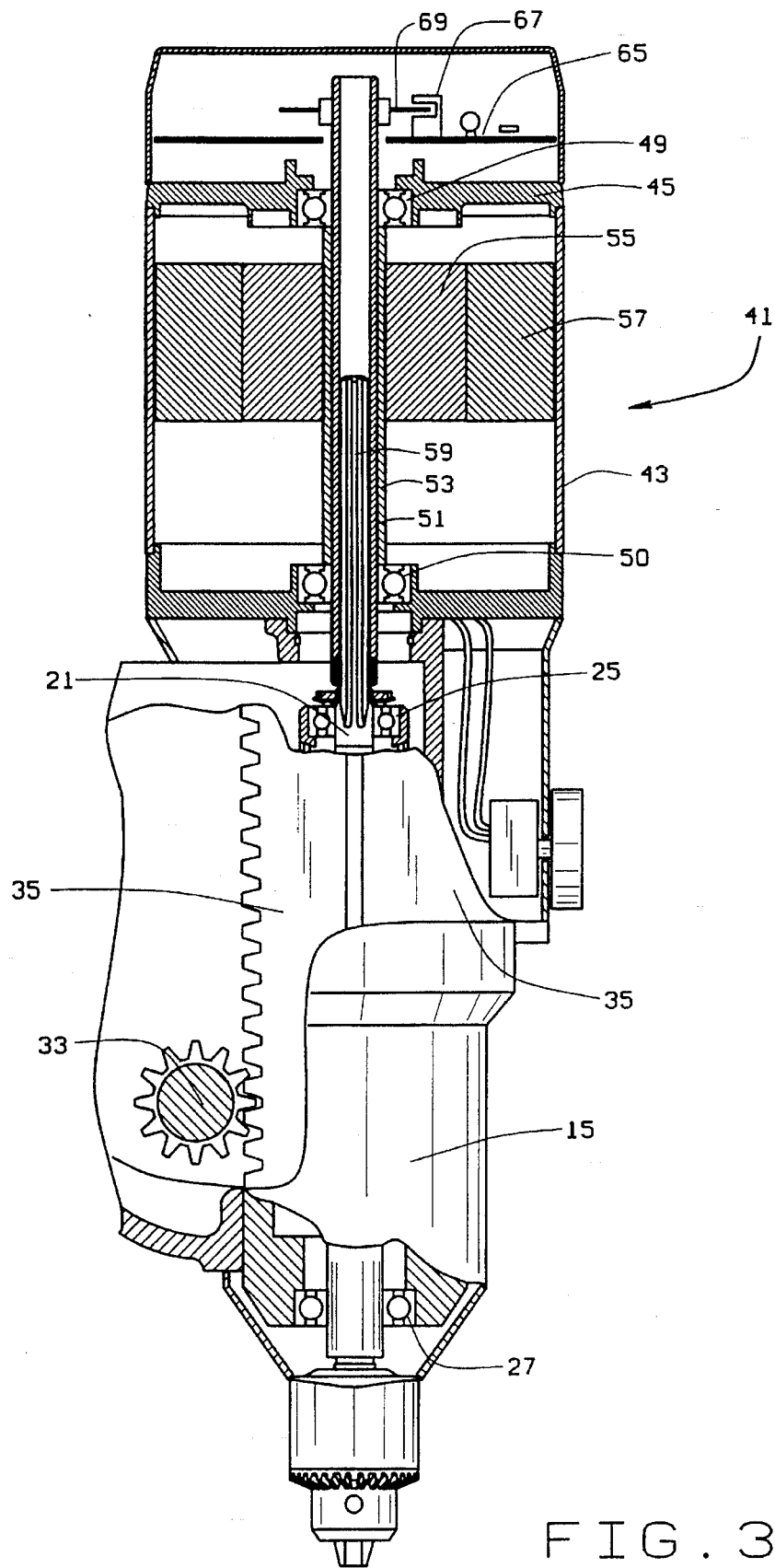
FIG. 3 is a fragmentary side elevational view, party in section, of the variable speed direct drive drill press/router of the present invention.

The variable speed direct drive drill press/router is generally designated 1 in the drawings and includes a frame having a vertically extending rigid column 3 that supports a horizontal bed 5 in transverse relationship to the column 3. The horizontal bed 5 is vertically adjustable by the rotating handle 7 that moves a pinion (not shown) along the rack 9 of the column, as is well known in the art. At the upper end of the column 3, a housing crown 11 is internally connected to a housing support arm 13 at one end in order to support the housing 15 at the opposite end of the housing support arm 13. As best seen in FIG. 1 of the drawings, the housing 15 is mounted in general overlying relationship to the housing bed 5 and includes an upper end 17 and a lower end 19. A generally vertically extending spindle 21 (see FIGS. 3–4) is rotatably mounted within and extends below the lower end 19 of the housing 15 for interchangeably receiving a drill chuck or router collet 23 at the lower end of the spindle 21, as is well known. For rotatably supporting the generally vertically extending spindle 21 within the housing 15, a pair of spaced roller bearings 25, 27 are mounted within the quill 22 and rotatably support the vertically extending spindle 21. The quill 22 is in turn slidably mounted within the housing 15.

In order to axially move the spindle 21 and quill 22 desired predetermined distances toward and away from the horizontal bed 5, a manually engageable driver or driver motor may be utilized. As illustrated in the drawings, the driver 29 is a manually engageable driver which includes spaced arms 31 for rotating a driver shaft 30 which, in turn, rotates a driver pinion 33 that engages a rack 35. The rack 35 is connected to the spindle 21 through the quill 22 for axially moving the spindle 21 desired predetermined distances toward and away from the horizontal bed 5. A scale 37 is associated with the driver 29 in order to provide a visual readout of the axial movement of the spindle 21.

The above features are generally known in the art and form the general background components that are effectively utilized in the variable speed direct drive drill press/router of the present invention.

Unlike the prior art which has used induction motors and belt/step pulleys to vary spindle speed while the induction motor runs at constant speed, the variable speed direct drive drill press/router one of the present invention includes a variable switched reluctance motor 41 that is mounted to the upper end 17 of the housing and is directly connected to the spindle 21 for rotary driving engagement at a desired range of predetermined speeds throughout the entire range of axial movement of the spindle 21 by the driver 29.

Figure 4:
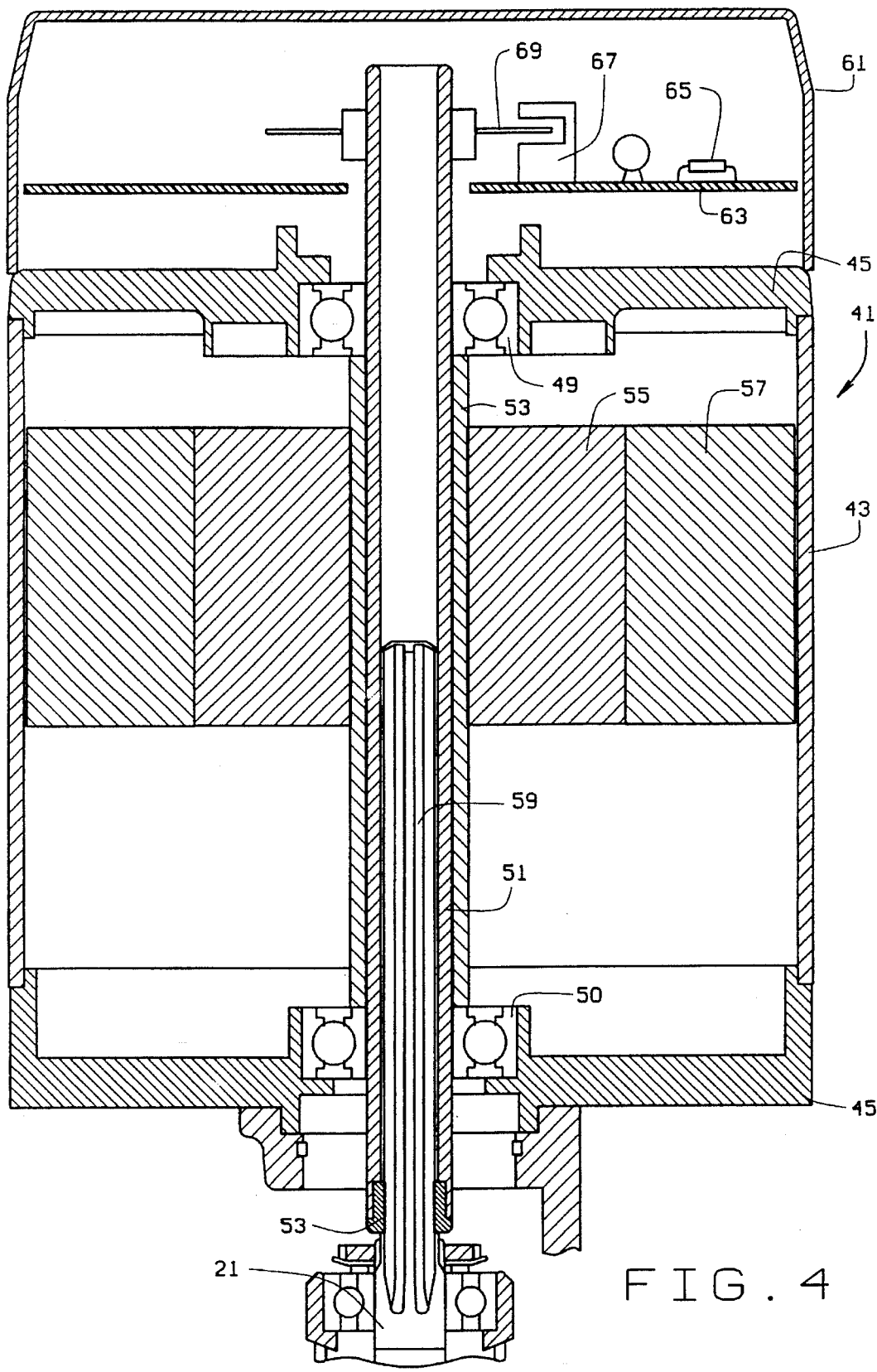
FIG. 4 is an enlarged sectional view of the variable speed direct drive components incorporated in the drill press/router of the present invention.
Figure 5:
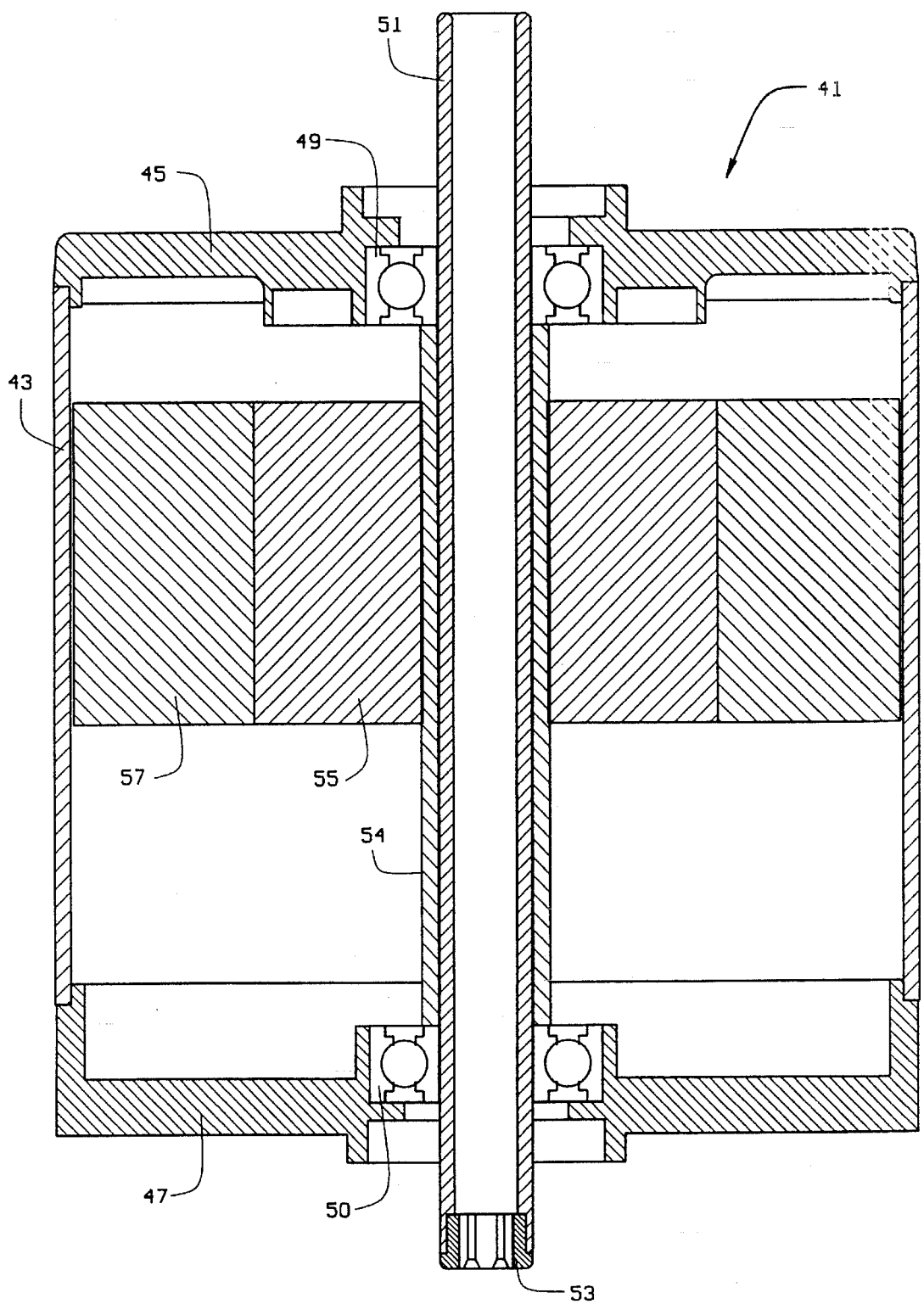
FIG. 5 is an enlarged sectional view of the switched reluctance motor used in the direct drive drill press/router of the present invention.

The switched reluctance motor 41 is best shown in FIGS. 4–5 of the drawings and includes a cylindrically shaped outer shell 43 which is operably associated with upper and lower end bells 45, 47. As illustrated in FIG. 1 of the drawings, the lower end bell 47 may be integral to the upper closed end of the housing 15 in order to minimize the parts utilized and provide a combined overall ornamental look and appearance to the housing 15 and the switched reluctance motor 41.

Centrally disposed within the upper and lower end bells 45, 47 are spaced roller bearings 49, 50, respectively, which rotatably support the motor shaft 51, as illustrated. The motor shaft 51 extends above and below the upper and lower end bells 45, 47 respectively and is hollow. The hollow motor shaft 51 includes an internally splined hollow insert 53 at its lower end for reasons presently to be discussed. A shaft sleeve 54 surrounds the hollow motor shaft 51 and rotatably supports a series of rotor laminations 55 relative to the fixed stator assembly 57 that is mounted to the outer shell 43.

Although not specifically illustrated in the drawings, switched reluctance motors conventionally have poles or teeth on both the stator and the rotor. There are phase windings on the stator but no windings on the rotor. Each pair of diametrically opposite stator poles is typically connected in series to form one phase of the switched reluctance motor. Torque is produced by switching current on in each phase winding in a predetermined sequence that is synchronized with the angular position of the rotor such that a magnetic force of attraction results between the rotor and stator poles that are approaching each other. While a variety of different types and kinds of switched reluctance motors can be utilized, it will be understood that the speed of switched reluctance motors can be easily controlled and at the same time have high torque at low speeds. As a result, switched reluctance motors have found particular utility in the present invention for directly driving the spindle 21 without the need of pulleys and belts, as is the case with prior art drill presses and routers.

In order to enable the switched reluctance motor 41 to drive the spindle 21 in rotary driving engagement at a desired range of predetermined speeds throughout the entire range of axial movement of the spindle 21, it will be noted that upper portion of the spindle 21 is provided with external splines 59 which are complementary configured relative to the internal splines of the splined insert 53 that is mounted within the hollow motor shaft 51 for continuous cooperative driving mating engagement between the hollow motor shaft 51 and the spindle 21 throughout the entire range of axial movement of the spindle 21. In this way, the switched reluctance motor 41 may be used as a direct drive for the spindle 21 of the drill press/router 1 which thus also enables the lower end of the spindle 21 to interchangeably receive a drill chuck or router collet 23 for operating a workpiece rotating tool. The term "workpiece rotating tool" includes a drill, router, sander or other type of rotating tool that performs work on a workpiece.

A resilient coupling may be provided between the internal splines of the splined insert 53 and the external splines 59 of the spindle 21 to reduce vibration and noise. The resilient coupling may include making either or both of the external spindle splines 59 or internal splines of the insert 53 out of a resilient material such as plastic or hard rubber or a liner of resilient material may be used between the spindle splines 59 and the internal splines of the splined insert 53, in order to reduce or dampen noise and vibration.

The switched reluctance motor 41 may be mounted separate from the housing 51 and either fastened directly to the housing 15 or through resilient bushings, as may be desired. As indicated above, the lower end bell 47 of the switched reluctance motor 41 is shown in FIG. 1 as comprising the upper end of the housing 15, thus minimizing parts while providing a combined overall look and appearance for the direct drive drill press/router 1.

A shown in FIG. 4 of the drawings, a cover 61 may be positioned over the upper end bell 45 for housing a printed circuit board 63 that contains the electronic drive 65. The electronic drive 65 may include a shaft position encoder 67 that cooperates with a disk 69 or other equivalent element to determine the specific position/speed of the hollow shaft 51. As illustrated in FIG. 4 of the drawings, the hollow shaft 51 extends upwardly within the cover 61 and includes a disk 69 that spins with the hollow motor shaft 51 for read-out by the shaft position encoder 67, in a manner well known in the art. The electronic drive 65 may be spaced from the motor 41, as illustrated in FIG. 4 with the shaft position encoder 67 either spaced from or located within the motor 41 itself. Also, the electronic drive 65 and shaft position encoder 67 may also be located within the motor, if desired. The electronic drive for the switched reluctance motor may include a brake for stopping the spindle 21 to facilitate drill or router changes as well as a torque limiting means to restrain movement of a workpiece by a drill or router. The latter feature helps the user retain control of the workpiece if there is any movement of the workpiece by a drill bit, for example.

The electronic drive for the switched reluctance motor is continuously variable from a drill press speed range operating at approximately 300 to 5,000 rpm to a router speed range operating at approximately 15,000 to 25,000 rpm. If desired, a third speed range may be included for shaper cutters such as in the 10,000 rpm speed range. The motor speed can also be increased slowly during starting to provide a "soft start" in order to reduce the effects of workpiece movement or a loose cutter bit.

When operated as an overarm router, a proximity (optical, magnetic or capacitive) switch or mechanical switch may be provided to sense whether the drill chuck or router collet is in place and then allow high speeds only if the router collet is in place. This prevents operation of the drill press/router 1 as a router unless a router collet has been mounted to the lower end of the spindle 21.

From the foregoing, it will now be appreciated that the variable speed direct drive drill press/router of the present invention employs necessary drill press/router components in conjunction with a switched reluctance motor direct drive which drives a spindle through its full range of axial movement, while providing the desired low speed range for drill operation or high speed range for router operation. Thus, the variable speed high torque characteristics of switched reluctance motors can be effectively utilized in a combined drill press/router tool while enjoying numerous other features and advantages to assure continuous, trouble free, low maintenance and dampened noise/vibration operation.

In view of the above, it will be seen that the several objects and features of this invention are achieved and other advantageous results obtained.

We claim:

1. A direct drive drill press/router comprising:

a frame having a horizontal bed for supporting workpieces;

a housing supported by said frame above said horizontal bed, said housing having an upper end and a lower end;

a generally vertically extending spindle rotatably mounted within and partially extending below the lower end of said housing;

a driver connected to said spindle for axially moving said spindle desired predetermined distances toward and away from said horizontal bed;

a switched reluctance motor mounted to the upper end of said housing and being connected to said spindle for rotary driving engagement at a desired range of predetermined speeds throughout the entire range of axial movement of said spindle;

the switched reluctance motor including upper and lower end bells, the lower end bell being integral with the upper end of the housing; and said spindle at its lower end being capable of interchangeably receiving one of a number of workpiece rotating tools.

2. A direct drive drill press/router comprising:

a frame having a horizontal bed for supporting workpieces;

a housing supported by said frame above said horizontal bed, said housing having an upper end and a lower end;

a generally vertically extending spindle rotatably mounted within and partially extending below the lower end of said housing; said spindle having spaced generally vertically extending external splines along its outer surface;

a manually engageable driver extending from said housing and connected to said spindle for axially moving said spindle desired predetermined distances toward and away from said horizontal bed;

a switched reluctance motor mounted to the upper end of said housing and including a hollow driven shaft vertically and axially aligned with said spindle;

said switched reluctance motor having upper and lower end bells, the lower end bell being integral with the upper end of the housing;

said hollow shaft having an insert with generally vertically extending internal splines at its lower end which are complementary configured with the external splines of said spindle for cooperative driving mating engagement therewith;

a resilient coupling between the internal splines of the hollow shaft and the external splines of said spindle;

said spindle and said hollow shaft having predetermined axial lengths for continuous cooperative driving mating engagement throughout the entire range of axial movement of said spindle; and said spindle at its lower end being capable of interchangeably receiving a drill or router for drilling or routing a workpiece.

3. A direct drive drill press router comprising:

a frame having a horizontal bed for supporting workpieces;

a housing supported by said frame above said horizontal bed, said housing having an upper end and a lower end;

a generally vertically extending spindle rotatably mounted within and partially extending below the lower end of said housing; said spindle having spaced generally vertically extending external splines along its outer surface;

a manually engageable driver extending from said housing and connected to said spindle for axially moving said spindle desired predetermined distances toward and away from said horizontal bed;

a switched reluctance motor mounted to the upper end of said housing and including a hollow driven shaft vertically and axially aligned with said spindle;

said hollow shaft having generally vertically extending internal splines along at least part of its interior wall which are complementary configured with the external splines of said spindle for cooperative driving mating engagement therewith;

a resilient coupling between the internal splines of said hollow shaft and the external splines of said spindle to reduce vibration and noise:

said spindle and said hollow shaft having predetermined axial lengths for continuous driving mating engagement throughout the entire range of axial movement of said spindle; and said spindle at its lower end being capable of interchangeably receiving one of a number of workpiece rotating tools.

4. The direct drive drill press/router as defined in claim 3 wherein the hollow shaft includes an internally splined insert at its lower end.

5. A direct drive drill press/router comprising:

a frame having a horizontal bed for supporting workpieces;

a housing supported by said frame above said horizontal bed, said housing having an upper end and a lower end;

a generally vertically extending spindle rotatably mounted within and partially extending below the lower end of said housing;

a manually engageable driver extending from said housing and connected to said spindle for axially moving said spindle desired predetermined distances toward and away from said horizontal bed;

a switched reluctance motor mounted to the upper end of said housing and including a hollow driven shaft vertically and axially aligned with said spindle, said switched reluctance motor including upper and lower end bells, the lower end bell being integral with the upper end of the housing;

said hollow driven shaft and said spindle being configured and sized for cooperative driving mating engagement during the entire range of axial movement of said spindle; and said spindle at its lower end being capable of interchangeably receiving one of a number of workpiece rotating tools.

6. The direct drive drill press/router as defined in claim 3 wherein the resilient coupling includes resilient splines formed on at least one of said hollow shaft or spindle.

7. the direct drive drill press/router as defined in claim 3 wherein the resilient coupling includes a liner of resilient material between the internal splines of said hollow shaft and the external splines of said spindle.

8. The direct drive drill press/router as defined in claim 3 wherein the switched reluctance motor is separate from and fastened to the housing by resilient bushings.

9. The direct drive drill press/router as defined in claim 3 wherein the switched reluctance motor includes upper and lower end bells, the lower end bell being integral with the upper end of the housing.

10. The direct drive drill press/router as defined in claim 5 and including an electronic drive for the switched reluctance motor.

11. The direct drive drill press/router as defined in claim 10 and including a cover which extends over the upper end bell, said electronic drive being mounted inside said cover.

12. The direct drive drill press/router as defined in claim 11 wherein the electronic drive includes a shaft position encoder.

13. The direct drive drill press/router as defined in claim 12 wherein the hollow shaft extends upwardly within said cover and cooperates with said shaft position encoder.

14. The direct drive drill press/router as defined in claim 12 wherein the electronic drive and the shaft position encoder are located within the motor.

15. The direct drive drill press/router as defined in claim 12 wherein the electronic drive is spaced from the motor while the shaft position encoder is located within the motor.

16. The direct drive drill press/router as defined in claim 10 wherein the electronic drive is separate from a covered shaft position encoder mounted on top of the switched reluctance motor.

17. The direct drive drill press/router as defined in claim 5 wherein the electronic drive for the switched reluctance motor includes a braking means for stopping the spindle to facilitate drill or router changes.

18. The direct drive drill press/router as defined in claim 17 wherein the electronic drive for the switched reluctance motor includes torque limiting means to restrain movement of the workpiece by a drill or router.

19. The direct drive drill press/router as defined in claim 3 and including a sensing switch to determine the presence of a drill chuck or router collet for selecting the speed of the spindle during drilling or routing.

20. The direct drive drill press/router as defined in claim 19 wherein the sensing switch is a proximity switch.

21. The direct drive drill press/router as defined in claim 19 wherein the sensing switch is a mechanical switch.

22. The direct drive drill press/router as defined in claim 3 wherein the variable reluctance motor is continuously variable from a drill press speed range operating at approximately 300 to 5000 rpm to a router speed range operating at 15,000 to 25,000 rpm.

23. The direct drive drill press/router as defined in claim 3 wherein the variable reluctance motor includes two speed ranges: a lower speed range for the drill press and a higher speed range for the router.

24. The direct drive drill press/router as defined in claim 3 including a three speed range: a lower speed range for the drill press, an intermediate speed range for shaper cutters and a higher speed range for the router.

25. The direct drive drill press/router as defined in claim 3 including a motor speed control for increasing the motor speed slowly during starting to reduce the effects of workpiece movement or a loose cutter bit.

* * * * *